(12) United States Patent
Wilson, Jr. et al.

(10) Patent No.: US 6,854,480 B2
(45) Date of Patent: Feb. 15, 2005

(54) REGULATED GAS SUPPLY SYSTEM

(75) Inventors: Henry Martin Wilson, Jr., Buford, GA (US); Paul Heath Fleming, Sugarhill, GA (US); Corey Howard Metcalfe, Savannah, GA (US)

(73) Assignee: Fats, Inc., Suwanee, GA (US)

( * ) Notice: Subject to any disclaimer, the term of this patent is extended or adjusted under 35 U.S.C. 154(b) by 0 days.

(21) Appl. No.: 10/631,276

(22) Filed: Jul. 31, 2003

(65) Prior Publication Data

US 2004/0025943 A1 Feb. 12, 2004

Related U.S. Application Data

(60) Provisional application No. 60/402,464, filed on Aug. 9, 2002.

(51) Int. Cl.[7] .............................................. G05D 16/10
(52) U.S. Cl. .............................. 137/505.18; 137/454.2; 137/505.25; 137/505.28
(58) Field of Search ....................... 137/505.25, 505.26, 137/505.27, 505.18, 505.28, 454.2; 124/71–76; 431/334; 222/3

(56) References Cited

U.S. PATENT DOCUMENTS

| | | |
|---|---|---|
| 2,023,497 A | 12/1935 | Trammell |
| 3,306,168 A | 2/1967 | Blumrick |
| 4,480,999 A | 11/1984 | Witherell |
| 4,678,437 A | 7/1987 | Scott |
| 4,823,401 A | 4/1989 | Gammarino |
| 4,877,403 A | 10/1989 | Jurgens |
| 4,898,205 A * | 2/1990 | Ross ..................... 137/505.12 |
| 5,427,380 A | 6/1995 | Hazard |
| 5,569,085 A | 10/1996 | Igarashi |
| 5,591,032 A | 1/1997 | Powell |
| 5,660,549 A | 8/1997 | Witts, III |
| 5,788,500 A | 8/1998 | Gerber |
| 5,816,817 A | 10/1998 | Tsang |
| 5,823,779 A | 10/1998 | Muehle |
| 5,842,300 A | 12/1998 | Cheshelski |
| 5,892,221 A | 4/1999 | Lev |
| 5,937,563 A | 8/1999 | Schuetz |
| 5,947,738 A | 9/1999 | Muehle |
| 5,980,254 A | 11/1999 | Muehle |
| 6,041,762 A * | 3/2000 | Sirosh et al. ............... 123/529 |
| 6,112,636 A | 9/2000 | Besselink |
| 6,146,141 A | 11/2000 | Schumann |
| 6,186,168 B1 * | 2/2001 | Schultz et al. ......... 137/505.11 |
| 6,283,756 B1 | 9/2001 | Danckwerth |
| 2003/0056778 A1 | 3/2003 | Schavone |
| 2003/0101979 A1 | 6/2003 | Schavone |

* cited by examiner

*Primary Examiner*—Stephen M. Hepperle
(74) *Attorney, Agent, or Firm*—Smith, Gambrell & Russell

(57) ABSTRACT

A regulated gas supply system having a body defining a pressurized gas reservoir connected to a high-pressure regulator that regulates the high pressure gas from the gas reservoir to disperse the gas at a desired pressure. The regulating assembly includes a piston chamber with a piston slidably positioned in the piston chamber. A spring is positioned between one side of the piston and the piston chamber, with the piston including a piston channel to allow pressurized gas to flow through the piston. Pressure is developed on the piston opposite the spring that is proportional to the force of the spring, providing a balanced piston. The system is miniature and self-contained to fit inside any number of small pneumatically operated devices.

8 Claims, 3 Drawing Sheets

REGULATED GAS SUPPLY SYSTEM

FIELD OF THE INVENTION

The present application claims priority to U.S. Provisional Patent Application No. 60/402,464, filed on Aug. 9, 2002.

DESCRIPTION OF PRIOR ART

Because small pneumatically operated devices require a supply of pressurized gas at constant pressure, current technology requires the use of external tanks or compressors in conjunction with a separate gas pressure regulator. In order to supply the regulated gas to the device, either a hose is required from the regulated supply to the inlet port of the device, or the tank and regulator must be externally attached to the device. This requirement limits both usability and portability.

For devices that only require a small volume of gas, a miniature, self-contained, regulated gas supply is desired. Current high-pressure regulators are large and bulky, and require a means of attaching them to a high-pressure gas reservoir. Further, current reservoirs themselves are too large to be practical for use with portable and small pneumatically operated systems.

BRIEF SUMMARY OF THE INVENTION

The present invention is a regulated gas supply containing both a pressurized gas reservoir and a high-pressure regulator. The system is miniature and self-contained to fit inside any number of small pneumatically operated devices. Furthermore, the regulated gas supply can be designed to facilitate rapid replacement of the entire assembly in order to replenish the gas supply once the reservoir is depleted, and the gas reservoir is easily replenish with gas after being emptied.

The combination of all of the above features has not been previously accomplished in a portable regulated gas supply.

BRIEF DESCRIPTION OF THE DRAWING

An apparatus embodying features of the claimed invention are depicted in the accompanying drawing which form a portion of this disclosure and wherein:

DESCRIPTION OF THE PREFERRED EMBODIMENT

Figure 1:
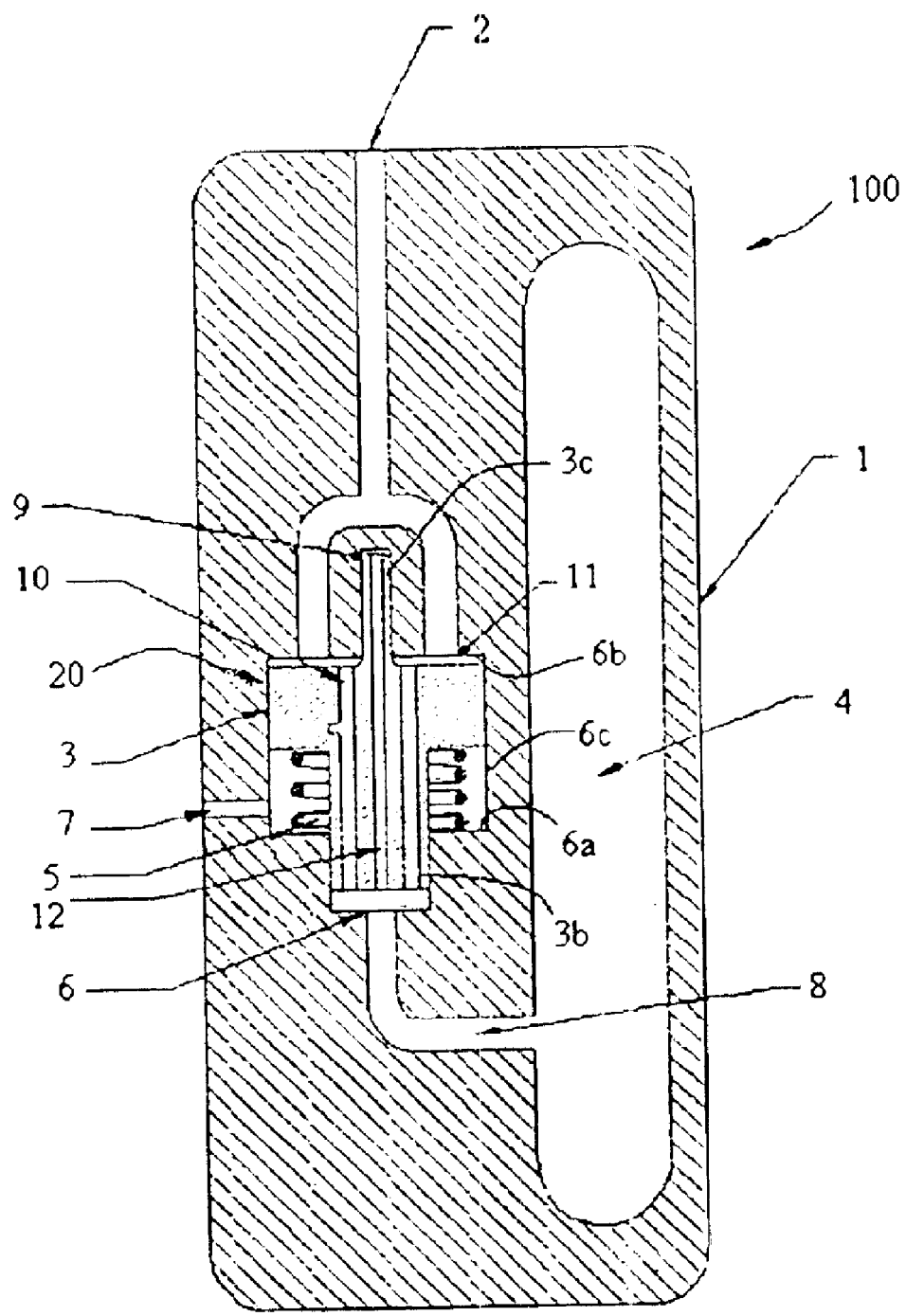
FIG. 1 is a sectional view of the regulated gas supply system comprising a high-pressure reservoir and a balanced regulator assembly including a piston and piston chamber.

Referring to FIG. 1, the regulated gas supply 100 of the present invention is illustrated. The regulated gas supply 100 is a miniature and self-contained apparatus. In particular, the regulated gas supply 100 includes a body 1, such as a housing or a cartridge, preferably surrounding a pressurized gas reservoir 4 and a regulating assembly 20, although the gas reservoir 4 may be external to the body 1. The regulating assembly 20 includes a piston 3 having a piston flange 3a and a spring 5 that are housed in a piston chamber 6. The piston chamber 6 includes a chamber seat 6a and an uppermost surface 6b opposite said chamber seat 6a, with a chamber wall 6c connecting said chamber seat 6a and uppermost surface 6b. The spring 5 is positioned between the piston flange 3a and the chamber seat 6a. The force of the spring 5 will tend to push the piston 3 away from the chamber seat 6a, thereby allowing gas to flow from inlet passage 8 to piston channel 10, and then out of the body through gas outlet 2.

Figure 2:
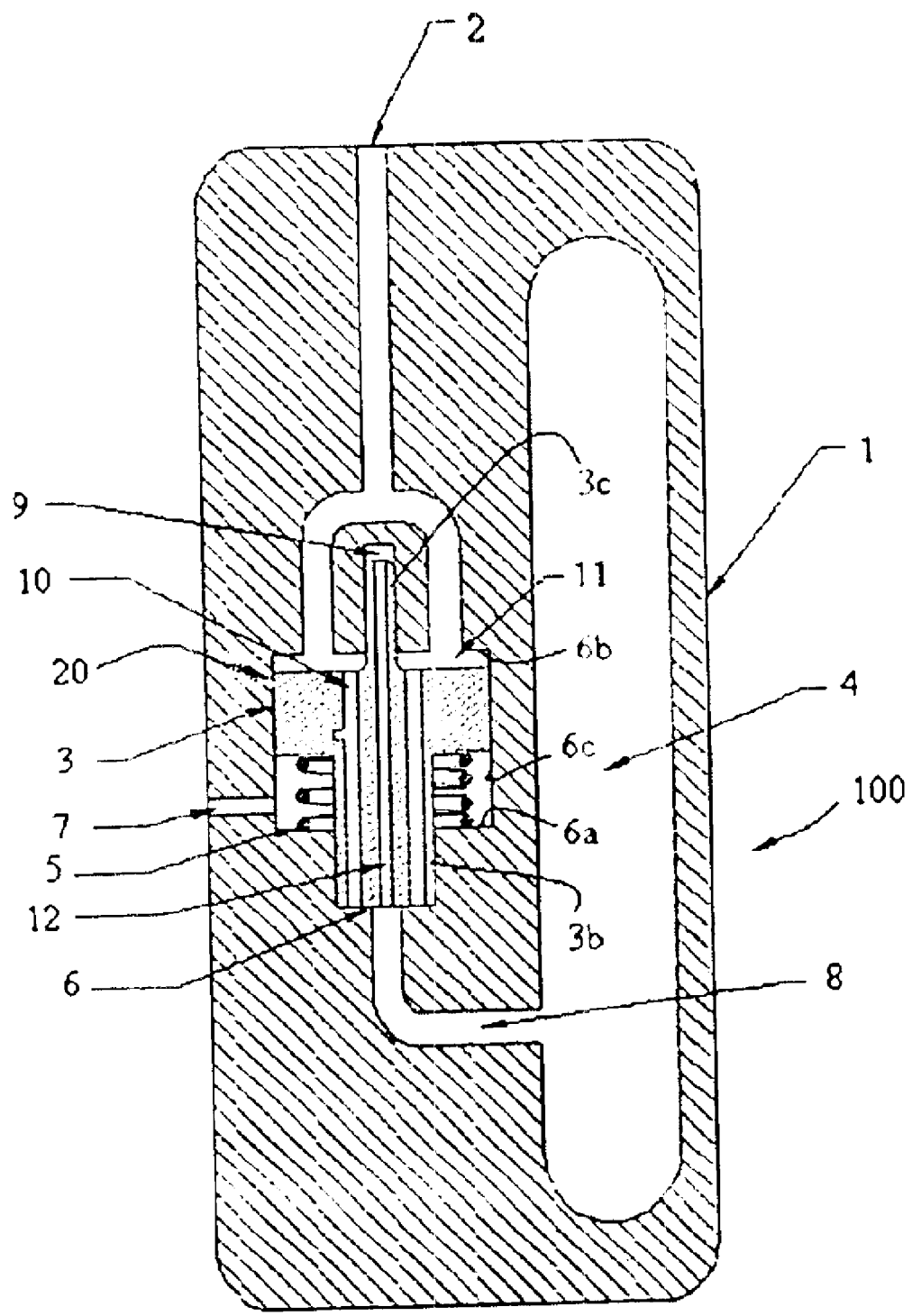
FIG. 2 is a sectional view of the regulated gas supply system as illustrated in FIG. 1, with the piston being forced proximate the chamber seat.

Comparing FIGS. 1 and 2, as the pressure in the gas outlet 2 increases, pressure will also increase in an upper cavity 11 of the piston chamber 6. As the pressure in the upper cavity 11 increases, a force develops on the piston 3 proportional to the pressure in the upper cavity 11. This pressure in the upper cavity 11 counteracts the force of the spring 5, and when the pressure is great enough, the piston 3 will be forced against the seat 6a (see FIG. 2). When the piston 3 abuts the chamber seat 6a, piston channel 10 within the piston 3 will abut the body 1, thereby preventing further gas flow from the gas reservoir 4. Furthermore, the piston chamber 6 containing the spring 5 is vented to the atmosphere through vent aperture 7, thus maintaining a constant relationship between regulated pressure and atmospheric pressure.

In order to counteract the force of the high pressure against the portion of the piston 3 that is constantly exposed to the high pressure in the gas reservoir 4, the present design further includes a secondary chamber 9 that is engaged by one end of the piston 3. In particular, the piston 3 includes a piston body 3b and a piston extension 3c, wherein piston extension 3c engages the secondary chamber 9. A central channel 12 is employed through the piston body 3b and piston extension 3c to allow the high-pressure gas to flow into the secondary chamber 9. The area of the piston 3 acted upon by the gas in secondary chamber 9 is equal to the area of the piston 3 that is constantly exposed to the same high-pressure gas. This arrangement causes the piston 3 to be balanced, so that changes in the pressure of the gas in the reservoir 4, such as when gas is withdrawn during use, or due to temperature changes in the gas, do not affect the regulated pressure at the outlet port 2. The pressure at the outlet 2 is therefore proportional to the force of the spring 5. If the force of spring 5 is increased, the regulated pressure is also increased, conversely, if the force of the spring 5 is decreased, the regulated pressure is also decreased.

Figure 3:
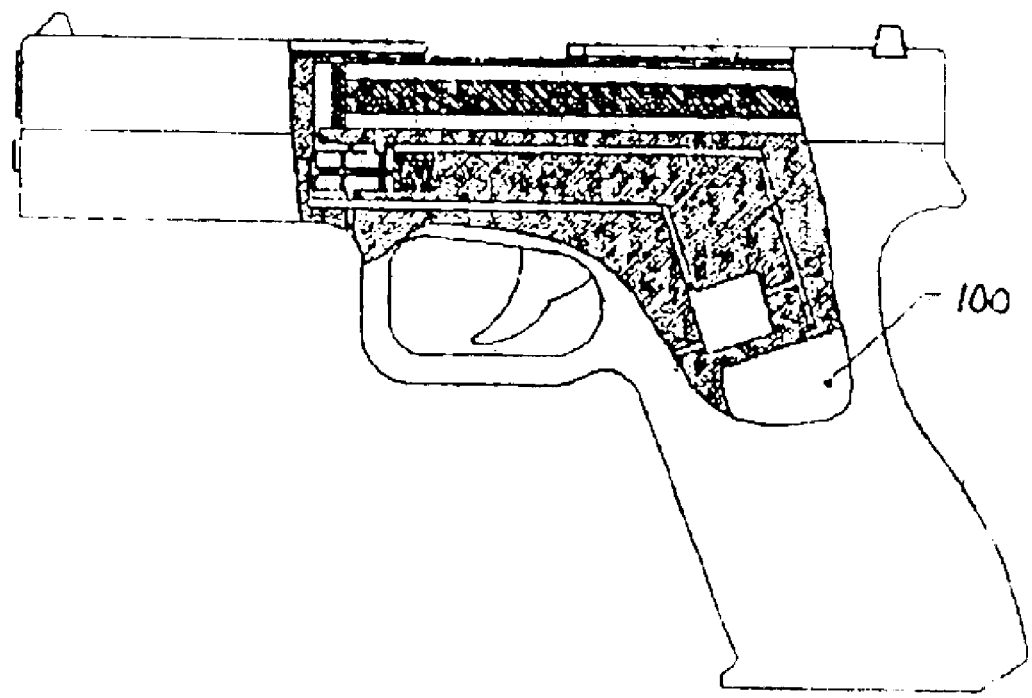
FIG. 3 is a sectional view of the regulated gas supply system of the present invention used in a firearm simulator.

It is foreseen that the present self-contained regulated gas supply 10 can be used in multiple designs of pneumatically operated devices that require a portable supply of pressurized gas at constant pressure for convenient operation of the particular device. In one embodiment, the regulated gas supply 100 could be used with firearm simulators 30, such as the one illustrated in FIG. 3. In this embodiment, the regulated gas supply 100 is able to provide the necessary gas at the desired pressure level such that the release of the gas at gas outlet 2 will control the simulated force of the firearm 30 being shot, and it may further provide the necessary force to lock the firearm from further operation. While one embodiment of the regulating assembly 20 is connected to the gas reservoir 4 within the body 1, it is additionally foreseen that the regulating assembly 20 may be connected to a gas supply not found within the body 1. For example, the regulating assembly 20 may be connected to an external carbon dioxide tank, thereby regulating the gas supplied to the firearm simulator 30 or other device.

Thus, although there have been described particular embodiments of the present invention of a new and useful REGULATED GAS SUPPLY SYSTEM, it is not intended that such references be construed as limitations upon the scope of this invention except as set forth in the following claims.

What is claimed is:

1. A method for controlling the pressure of gas from a gas reservoir using a regulated gas supply system comprising the steps of:
   a) providing a body defining a piston chamber connected to the gas reservoir by a channel, said piston chamber having an uppermost surface, a seat, and a chamber wall connecting said uppermost surface with said seat;
   b) urging a piston in said piston chamber away from said seat with a spring;
   c) releasing gas from the gas reservoir into said piston camber, said gas flowing through a piston channel through said piston;
   d) applying a pressurized force on said piston flange opposite said spring; and
   e) forcing said piston into contact with said seat of said piston chamber to obstruct the flow of the gas through said piston channel;
   f) providing a secondary chamber and a central channel traversing said piston from a first end of said piston to a second end of said piston;
   g) engaging said secondary chamber with a first end of said piston;
   h) distributing gas through said central channel into said secondary chamber to balance said piston
   i) exerting said gas from said body through a gas outlet.

2. A regulated gas supply system for regulating the distribution of a highly pressurized gas to a desired pressure comprising:
   a body defining a gas inlet to receive a highly pressured gas and a gas outlet to distribute a regulated gas;
   a piston chamber defined in said body;
   a secondary chamber defined in said body;
   a piston slidably positioned in said piston chamber, said piston having piston channel traversing said piston and a piston extension to slidably engage said secondary chamber;
   a spring biasing said piston within said piston chamber, and
   a central channel extending through said piston and said piston extension.

3. The regulated gas supply system of claim 2 further comprising a vent aperture through said body, said vent aperture proximate said spring.

4. The regulated gas supply system as described in claim 2 wherein said piston chamber comprises:
   an uppermost surface;
   a seat opposing said uppermost surface; and
   a chamber wall between said uppermost surface and said seat.

5. The regulated gas supply system as described in claim 4 wherein said piston comprises:
   a piston body, wherein said piston channel traverses said piston body; and
   a piston flange abutting said piston body, said piston flange engaging said chamber wall.

6. The gas regulating assembly of claim 5, wherein said spring is positioned between said piston flange and said seat to urge said piston flange away from said seat.

7. A gas regulator for receiving a highly pressurized gas from a gas source and distributing the gas at a desired pressure, said regulator comprising:
   a housing having an gas inlet and a gas outlet;
   a piston chamber defined in said housing between said gas inlet and said gas outlet, said piston chamber including an uppermost surface, a seat opposing said uppermost surface, and a chamber wall connecting said uppermost surface with said seat;
   a secondary chamber defined in said housing;
   a piston slidably positioned in said piston chamber, said piston having a piston body with an abutting flange engaging said chamber wall, a piston channel traversing said piston body, a piston extension extending from said piston body to engage said secondary chamber, and a central channel traversing said piston; and
   resilient means for urging said piston flange away from said seat, said resilient means positioned between said piston flange and said seat.

8. The regulator as described in claim 7, wherein said resilient means comprises a spring.

* * * * *